Figure 1:
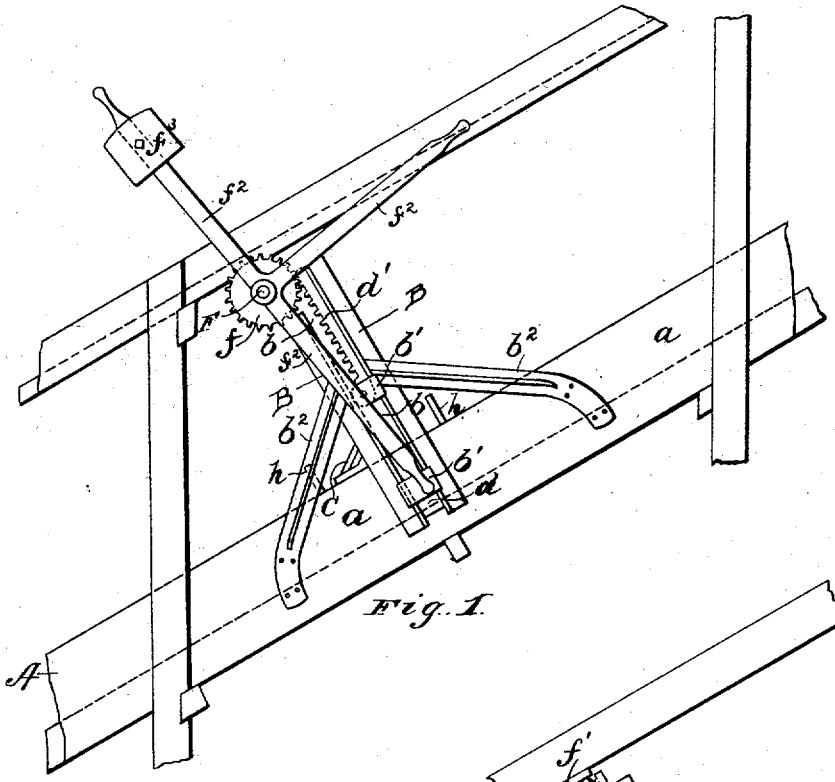

No. 11,739. Reissued May 9, 1899.

J. N. BRIGGS.

APPARATUS FOR PLANING CAKES OF ICE.

(Application filed July 16, 1894.)

2 Sheets—Sheet 1.

Witnesses
W. R. Edelen,
Geo. Fairs

Inventor.
John N. Briggs
by Foster & Maurer
his attorneys

THE NORRIS PETERS CO., PHOTO-LITHO., WASHINGTON, D. C.

No. 11,739. Reissued May 9, 1899.

J. N. BRIGGS.

APPARATUS FOR PLANING CAKES OF ICE.

(Application filed July 16, 1894.)

2 Sheets—Sheet 2.

Witnesses
W. R. Eaton.
Geo. Lewis

Inventor.
John N. Briggs
by Toby & Mauro
his attorneys

THE NORRIS PETERS CO., PHOTO-LITHO., WASHINGTON, D. C.

UNITED STATES PATENT OFFICE.

JOHN N. BRIGGS, OF COEYMANS, NEW YORK.

APPARATUS FOR PLANING CAKES OF ICE.

SPECIFICATION forming part of Reissued Letters Patent No. 11,739, dated May 9, 1899.

Original No. 367,267, dated July 26, 1887. Application for reissue filed July 16, 1894. Serial No. 517,750.

*To all whom it may concern:*

Be it known that I, JOHN N. BRIGGS, a citizen of the United States, residing at Coeymans, in the county of Albany and State of New York, have invented a new and useful Improvement in Apparatus for Planing Cakes of Ice, which is fully set forth in the following specification.

My invention consists of the combination of an ice-planing machine of peculiar construction with an ice-elevator. Its object is to deliver the cakes of ice transported by the elevator from the pond or river into the storage-house in a clean and perfect condition, so as to admit of their proper and economical storage, whether the circumstances require the cakes to be cut to a uniform thickness or to be of varying thicknesses. Numerous attempts have been made to construct such machinery, and a number of such machines have been patented; but so far as I know the machine which is the subject of this invention is the only one which combines the features that are found to be necessary for the successful use of machines of this general class. One form of such older machines was patented to me on the 3d day of August, 1886, No. 346,576, reissued February 18, 1890, Reissue No. 11,060. Such a machine in order to be practically satisfactory must possess the characteristics hereinafter set forth in order to meet the varying conditions encountered in this peculiar art.

The cutter must consist of a number of points entering the ice in such a manner as not only to cut but to groove it at one operation. The grooves lessen the labor of storing the ice and prevent the cakes from freezing together in the storehouse and facilitate the removal of the cakes for consumption. The cutter-head must be capable of being set at a fixed point in order to cut the ice of a uniform thickness. It must be capable of quick, easy, and accurate adjustment, so as to cut successive cakes of ice as they travel rapidly up the elevator at variable thicknesses and to groove only a quickly-advancing cake of clear ice, and to plane and groove other quickly-advancing cakes that have "snow" or impurities on the surface, as may be desired, and also so as to be raised to miss entirely bad or dirty cakes and lumps of ice. The cutter-head must be held with absolute rigidity, so as to positively resist the force exerted by the advancing ice at any point of adjustment. The angle of the cutter must remain uniform and unchanged at every level of adjustment. The cutter-head must be capable of being almost instantaneously lifted with certainty and ease to avoid the destruction of the machine by an avalanche of backsliding or rebounding ice coming from the upper part of the elevator. In like manner it must be capable of being quickly raised out of the way of irregular lumps passing up the elevator that might otherwise damage or bend the cutter-bar, thus destroying its utility. The mechanism must be incapable of binding or clogging, which would prevent quick lifting or lowering of the cutter-head, and it must be positively moved and positively held for every adjustment. The raising and lowering mechanism must be light, strong, compact, and convenient, capable of quick adjustment throughout the entire range of its movement when setting for use, as well as capable of instantaneous action in case of backsliding ice, so as to avoid danger both to the machine and to the operator. The guides must be perpendicular to the plane of the elevator, so that the raising and lowering of the cutter-head and its adjustment at any level shall be effected instantly and without any horizontal lost motion, and so that the strain of the cutting will not affect the rock-shaft and lever, and so that the resistance to the force of the ice against the cutters shall be substantially wholly borne by the perpendicular guides. I have attained these objects by means of the mechanism illustrated in the accompanying drawings, which, being herein referred to, form part of this specification, and in which—

Figure 2:
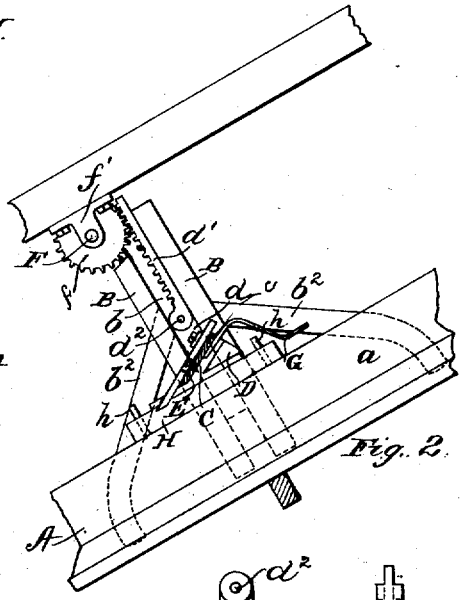
Figure 3:
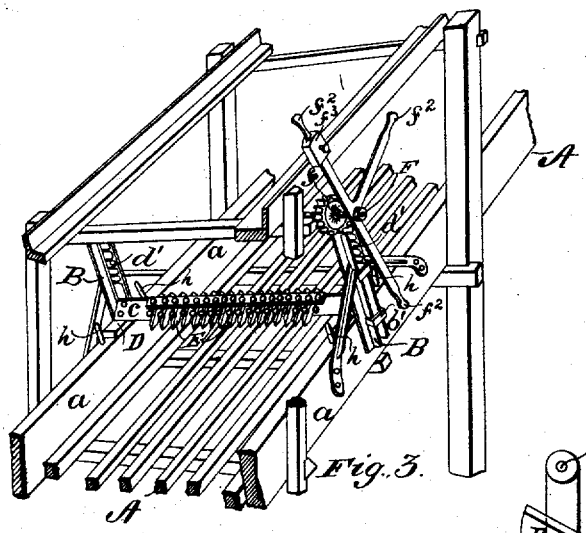
Figure 6:
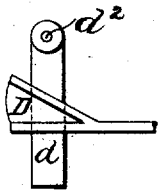
Figure 5:
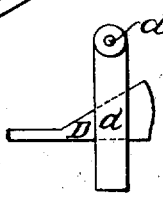
Figure 4:
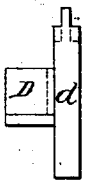

Figure 1 is a side elevation of my apparatus applied to an inclined elevator for ice-houses; Fig. 2, a longitudinal section, and Fig. 3 a perspective view, of same; Fig. 4, an enlarged front elevation of one of the end shoes for the cutter-head, and Figs. 5 and 6 side elevations of same.

As represented in the drawings, the inclined elevator or railway A (of which only a short portion is shown) is of a form commonly used for raising cakes of ice to the house in which they are stored and on which the cakes are moved by means of endless chains that are driven by any suitable motive power; but while it should be understood that said chains are used in this apparatus their construction is well known, and they are therefore omitted from the drawings.

B represents guide-frames for the cutter-head of the planing device, which are erected on the string-pieces *a* of the inclined elevator. Said guide-frames may be made of angle-bars, that are arranged so as to form parallel slots *b*, which are fixed at right angles to the upper line of the elevator. The angle-bars at the opposite sides of the slots *b* are held together by clamps *b'* and are supported in position by the braces $b^2$.

C is the cutter-head, which consists of a cross-plate *c*, having at each end a shoe D, by which it is held at an acute angle to the plane of inclination of the elevator. Said cutter-head is provided with a series of chisels or cutters E, which are independent of each other, each being separably removable from said cutter-head, as fully set forth in my prior patent, hereinbefore referred to. The shoes D are arranged to extend over the upper surface of both string-pieces *a* and are provided with lugs or flanges *d*, which are fitted to slide up and down in the slots *b* of the guide-frames. Each of said shoes is also provided with a toothed rack *d'*, which extends upwardly in the slot *b* in which it is contained.

The guides serve the purpose of causing the cutter-head to always be positively raised and lowered perpendicularly to the plane of the elevator, thus enabling the cutter-head to be held positively and rigidly at any elevation and with the cutting-knives always presenting the same angle. The racks being directly attached to the cutter-head, the guides for the cutter-head necessarily act as guides for the racks, guiding the parts of the racks near the places of attachment, and both the cutter-head and the racks move in unison in directions perpendicular to the plane of the elevator. If the cutter-head and the racks are attached together rigidly—as, for instance, if they are cast in one piece—the guides for the cutter-head would act also as guides for the racks even although the cutter-head alone came in contact with the guides. Each rack is preferably pivoted, as at $d^2$, to the upper part of the flange *d* for the purpose of lessening the liability of said racks becoming broken from the shoe when the cutter-head is subjected to any sudden strain or jar. When the racks are attached to the cutter-head in this preferred manner, it becomes incidentally necessary to provide means to hold each rack into engagement with its pinion, as otherwise it would fall away, and for this purpose the guides are in contact with the racks at the extreme upper portion of said guides, as shown in the drawings, and there are two long guides, one on each side of the machine, that serve to perform all these offices. It is obvious, however, that the same purposes would be served by short guides controlling the cutter-head and any means placed at a greater height that would serve to cause each rack to rest against its pinion and prevent it from rotating backward around the pivot $d^2$.

The racks *d'* engage with pinions *f*, that are secured to a cross-shaft F, that is fitted to rotate in journal-boxes *f'*, secured to the framework of the elevator or to the guide-frames. The shaft F is provided at one end with a series of radial arms or hand-levers $f^2$, one of which should have a counterweight $f^3$ to balance the weight of the cutter-head. Springs G, attached to the lower side of the cutter-head, are adapted to bear upon the upper surface of the cakes of ice as the latter pass under the cutter-head, and by said springs the cake of ice being operated on by the cutters is prevented from tilting.

For the purpose of adapting the machine for finishing the ice to different thicknesses chocks or blocks H are provided to fit upon the upper side of the string-pieces *a*, so that the shoes of the cutter-head will obtain a firm bearing thereon. Said chocks are retained in position by pins *h* or other suitable means, so that when the cutter-head is raised therefrom no accidental displacement of said chocks is likely to occur, and by having a number of said chocks of different thicknesses the cakes of ice may be reduced to a thickness corresponding to that of the chocks used.

Figure 7:
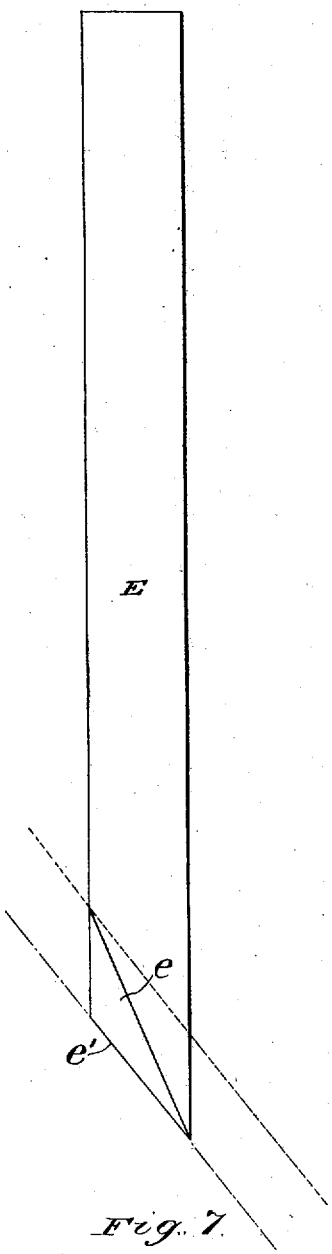
Figure 8:
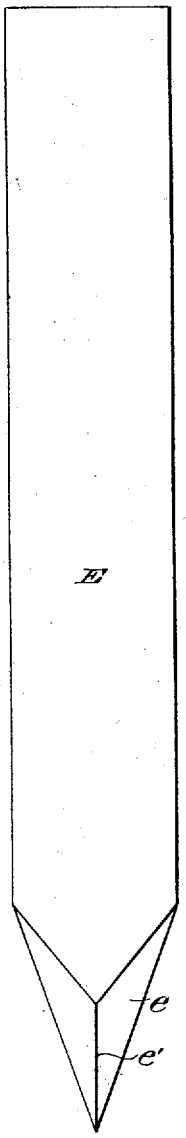
Figure 9:
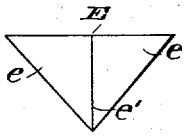

The operation of my apparatus is as follows: The cakes of ice are forced up the inclined elevator by means of endless chains in the usual manner, the cutter-head C being held down by the operative in charge by means of the arms $f^2$. When the ice reaches the cutter-head C, it will encounter the cutters E, which as the ice is forced along will penetrate the cake at the required depth and remove any excess of thickness therefrom and at the same time groove it. In some instances it is preferred to plane off the top of each cake of ice without regard to bringing all the cakes to a uniform gage of thickness, and in such cases the chocks H may be dispensed with. A little experience will enable the operative in charge to quickly determine at sight the best position for the cutter-head during its operation on the approaching cake of ice, and said cutter-head is under such perfect and positive control of the operative that he can easily maintain it at the position where its teeth first enter the cake of ice during the time required to effect the planing and grooving of said cake. When used in the way last described, I prefer to make the cutters E in the form shown in Figs. 7, 8, and 9, which are respectively an enlarged side elevation, an inverted plan view, and an end elevation of a modified form of my cutter or chisel, which, while it has the sharp diamond-shape point of the cutters shown in my prior patent herein referred to, has its cutting edges formed of two beveled facets *e*, by which a ridge or heel *e'* is obtained, and the latter by bearing in the lower part of the channel formed in the ice by the action of each cutter lends material aid in keeping the ice down to its place against the tendency of the cutters to raise the cakes from the ribbons of the elevator. The depth of the channels formed in the ice is indicated by dotted lines in Fig. 7, wherein is also shown how the ridge or heel *e'* of the cutter bears in the bottom of the channel.

In my apparatus the combination of the raising and lowering and holding or resisting mechanism with the cutter, consisting of a number of points capable of grooving as well as of cutting, is of the utmost importance whether the cakes of ice are required to be cut to a uniform thickness or to be cut of variable thicknesses or to be grooved only. By the use of such a combination when the cutter is lowered to a fixed position the cutter-points will cut through the ice to any depth required in practice to effect the reduction of the cakes to a uniform thickness. When the ascending cakes of ice are required to be cut to different thicknesses, the successive cakes can, as occasion may require, be grooved merely or the points of the cutter may be caused to penetrate into the ice to any depth that would be required in practice in order to remove snow or spongy ice or any impurities from the surface. These quick adjustments can be effected and the machine be operated in these different ways efficiently and without danger to the cutter or the other parts of the machine.

What I claim, and desire to secure by Letters Patent, is—

1. The chisel or cutter E formed of a prismatic bar having a sharp entering-point at its lower end, with cutting edges formed at acute angles to the front line of the cutter, and two facets, *e*, which are beveled back from the cutting edges and by which a central ridge or heel, *e'*, is formed at such an angle that said ridge will conform to the line of the cut produced by the entering-point of said cutter, as and for the purpose herein specified.

2. The combination, with the cutter-head and the pivoted racks directly attached thereto, of the guides for both cutter-head and the racks, arranged perpendicularly to the plane of the elevator, the pinions mounted on said guides and engaging in said racks, and the levers or arms for operating said pinions, a cutter consisting of a number of points entering the ice in such a manner as not only to cut but to groove it at one operation and an ice-elevator adapted to positively force the ascending cakes of ice into contact with the cutter and groover, all constructed substantially as described, so that the depth of the cut may be directly and positively regulated by means of the levers and the ice at the same time properly grooved for storage.

In testimony whereof I have signed this specification in the presence of two subscribing witnesses.

JOHN N. BRIGGS.

Witnesses:
W. H. L. LEE,
CHARLES H. SCHAEFER.